United States Patent
Iwasa

(10) Patent No.: US 9,986,137 B2
(45) Date of Patent: May 29, 2018

(54) IMAGE PICKUP APPARATUS

(71) Applicant: CANON KABUSHIKI KAISHA, Tokyo (JP)

(72) Inventor: Takayuki Iwasa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/377,606

(22) Filed: Dec. 13, 2016

(65) Prior Publication Data

US 2017/0171451 A1    Jun. 15, 2017

(30) Foreign Application Priority Data

Dec. 15, 2015  (JP) .................................. 2015-243816

(51) Int. Cl.
| | | |
|---|---|---|
| *H04N 5/225* | (2006.01) | |
| *H01Q 1/22* | (2006.01) | |
| *H01Q 9/04* | (2006.01) | |
| *H01Q 21/28* | (2006.01) | |

(52) U.S. Cl.
CPC ............ *H04N 5/2252* (2013.01); *H01Q 1/22* (2013.01); *H01Q 9/0407* (2013.01); *H01Q 21/28* (2013.01)

(58) Field of Classification Search
CPC ........ H04N 5/2252; H01Q 1/22; H01Q 21/28; H01Q 9/0407
See application file for complete search history.

(56) References Cited

U.S. PATENT DOCUMENTS

| | | | | |
|---|---|---|---|---|
| 4,521,861 A | * | 6/1985 | Logan | ..................... G01S 13/86 342/351 |
| 2017/0214119 A1 | * | 7/2017 | Aoki | .................... H01Q 1/2291 |
| 2018/0013199 A1 | * | 1/2018 | Rubin | ................... H04M 1/026 |
| 2018/0014747 A1 | * | 1/2018 | Akselrod | ............. A61B 5/0531 |

FOREIGN PATENT DOCUMENTS

| | | |
|---|---|---|
| JP | 2009-192900 A | 8/2009 |
| JP | 2014-056089 A | 3/2014 |

* cited by examiner

*Primary Examiner* — Mekonnen Dagnew
(74) *Attorney, Agent, or Firm* — Cowan, Liebowitz & Latman, P.C.

(57) ABSTRACT

An image pickup apparatus includes a first exterior member made of a conductive material, a second exterior member made of a nonconductive material, and an antenna covered by the second exterior member and configured to provide a wireless communication. The antenna includes a feeder configured to supply a current, an oscillator configured to oscillate the current as a radio wave, and an intermediate part located between the feeder and the oscillator. The feeder and the oscillator are farther from the first exterior member than the intermediate part.

15 Claims, 8 Drawing Sheets

IMAGE PICKUP APPARATUS

BACKGROUND OF THE INVENTION

Field of the Invention

The present invention relates generally to an image pickup apparatus, and more particularly to an image pickup apparatus that has a built-in antenna that can wirelessly communicate with an external device.

Description of the Related Art

There has been recently demanded an image pickup apparatus having new functions utilizing a plurality of wireless functions, such as a transport of image data, and a remote control and an acquisition of position information from an external device.

Japanese Patent Laid-Open No. ("JP") 2014-56089 proposes a configuration that arranges a WiFi antenna and GPS antenna in a space above a roof (dach) surface of a pentaprism, and fixes each component with a stabilizer.

JP 2009-192900 proposes a method for arranging a plurality of GSP antennas on a roof surface of a pentaprism and at a vertex, and for selecting a GPS to obtain position information, according to an orientation. JP 2009-192900 proposes a configuration that installs a GPS antenna in a metal member having an opening and closes the opening with another nonmetal member.

However, the prior art (WiFi antenna) disclosed in JP 2014-56089 is silent about orientations of a feeder that feeds the high-frequency current to antenna wiring and an oscillator that oscillates a radio wave as the high-frequency current. Thus, depending on the arrangement, the feeder and the oscillator may approach to an accessory shoe made of a conductive material, and lower the antenna performance.

Since JP 2009-192900 arranges the GPS antennas inside the metal member having the opening, a sufficiently wide opening necessary and the mechanical strength of the image pickup apparatus may run short when the antenna performance is prioritized. When the mechanical strength is prioritized, the narrow opening may lower the antenna performance.

SUMMARY OF THE INVENTION

The present invention provides an image pickup apparatus that includes a built-in wireless antenna, and can maintain the antenna performance when a conductive material is disposed around the antenna.

An image pickup apparatus according to the present invention includes a first exterior member made of a conductive material, a second exterior member made of a nonconductive material, and an antenna covered by the second exterior member and configured to provide a wireless communication. The antenna includes a feeder configured to supply a current, an oscillator configured to oscillate the current as a radio wave, and an intermediate part located between the feeder and the oscillator. The feeder and the oscillator are farther from the first exterior member than the intermediate part.

Further features of the present invention will become apparent from the following description of exemplary embodiments with reference to the attached drawings.

DESCRIPTION OF THE EMBODIMENTS

Figure 1A:
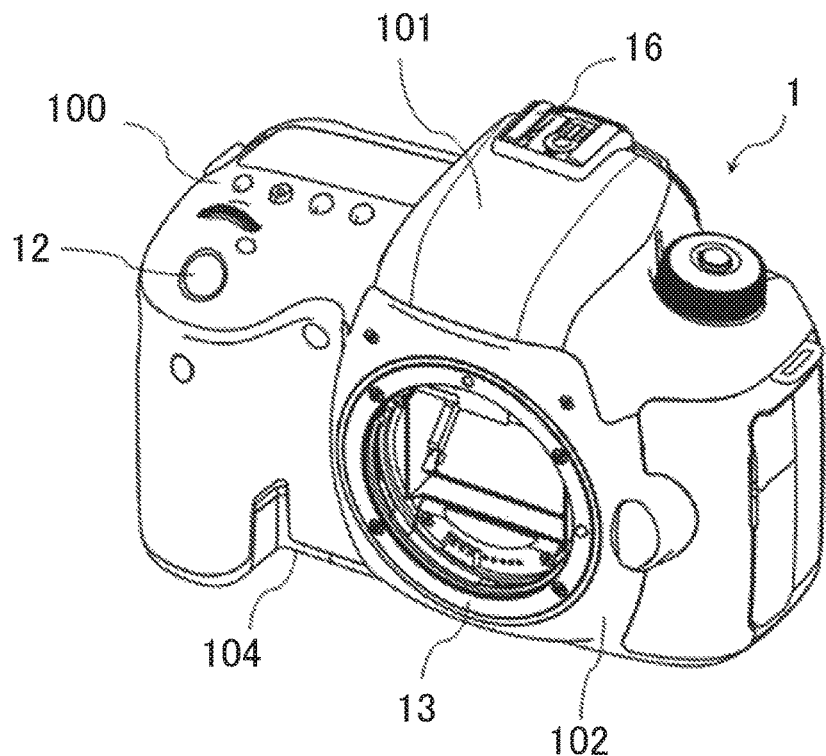
FIG. 1A is a front perspective view of an image pickup apparatus.
Figure 1B:
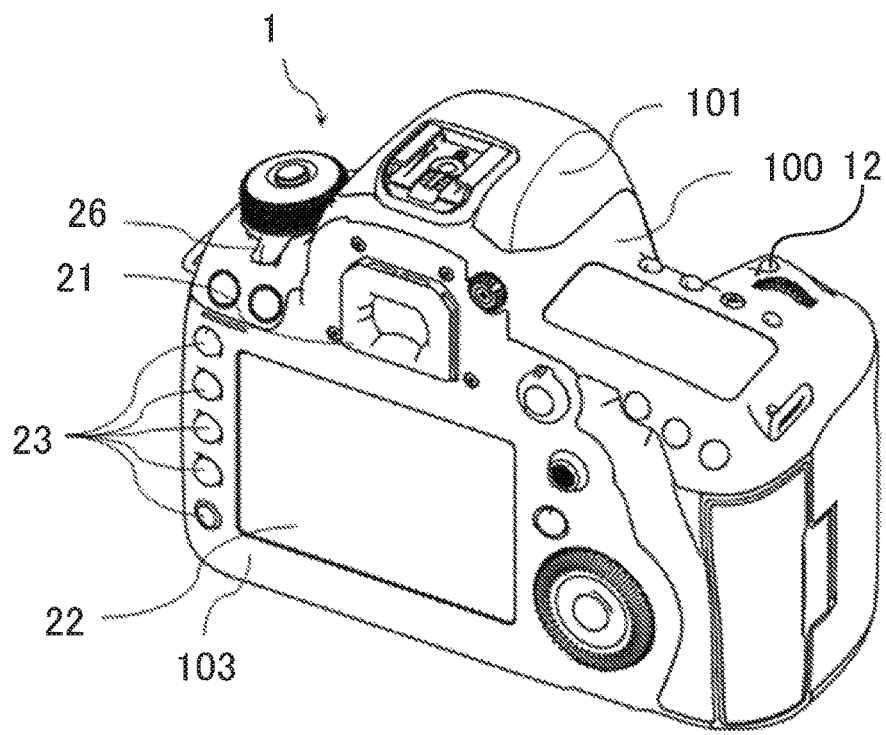
FIG. 1B is a rear perspective view of the image pickup apparatus.

Referring now to the accompanying drawings, a detailed description will be given of an embodiment according to the present invention. FIGS. 1A and 1B are perspective views illustrating an overview of an image pickup apparatus 1 according to the embodiment of the present invention.

An exterior of the image pickup apparatus body includes a top cover 100, a front cover 102, a back cover 103, and a bottom cover 104 is made of metal and conductive resin, such as magnesium alloy. Thus, the exterior of the image pickup apparatus 1 may be made of a conductive material (metal material), such as metal and conductive resin, from the standpoint of both the performance and quality, such as the EMI countermeasure, mechanical strength, and quality. An antenna cover 101 made of nonconductive resin, such as polycarbonate.

The image pickup apparatus 1 according to this embodiment thus includes a first exterior member made of a conductive material, such as the top cover 100, the front cover 102, the back cover 103, and the bottom cover 104, and a second exterior member made of a nonconductive material, such as an antenna cover 101. As described later, a plurality of communication modules each having an antenna that can provide a wireless communication, such as a first communication module, a second communication module, and a third communication module, provided inside a space covered by the antenna cover 101. Each of the plurality of communication modules provides a wireless communication using a different wireless communication standard. For example, the first communication module provides a wireless communication using a wireless communication standard different from that of each of the second communication module and the third communication module.

Reference numeral 13 denotes a lens mount to which an image pickup optical system can be attached. Reference numeral 16 denotes an accessory shoe, through which an accessory, such as a strobe unit used for image pickup is attached to the image pickup apparatus body. Reference numeral 12 is a release button to be pressed to start the image pickup preparation and image pickup. Reference numeral 21 denotes a viewfinder eyepiece used to observe an object image. Reference numeral 22 denotes a display unit configured to display image-pickup related information. Reference numeral 26 denotes a main switch operated by a user to start and end the power supply from the power source to each component in the image pickup apparatus. Operation buttons 23 are disposed. On the side of the display unit 22, and operated by the user to change a variety of settings of the image pickup apparatus 1. The display unit 22 displays a setting status. Other than the operation buttons 23, a similar operation is available through a button provided on the image pickup apparatus 1.

Figure 2:
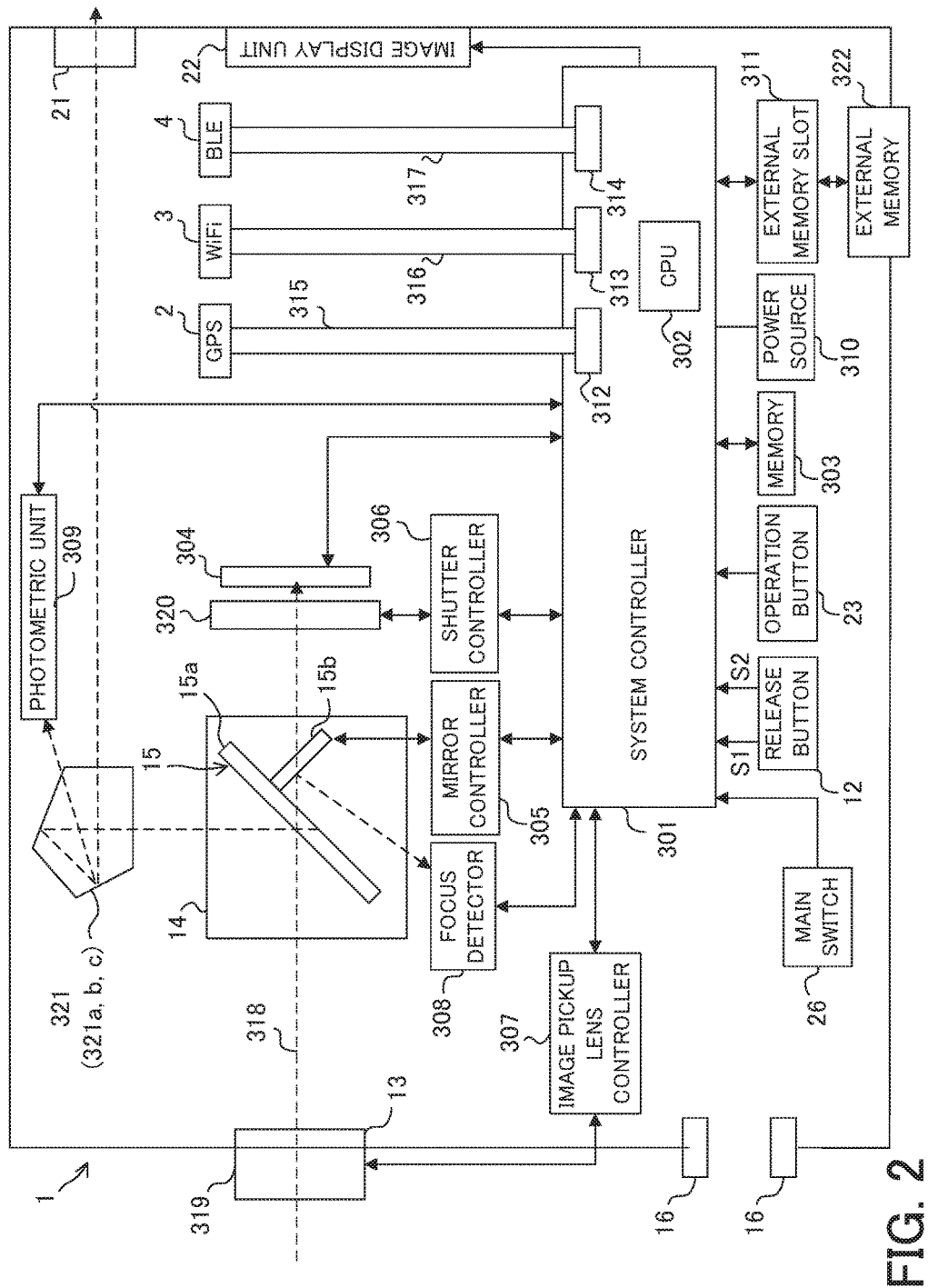
FIG. 2 is a schematic view illustrating a configuration of the image pickup apparatus.

FIG. 2 is a schematic view of a major configuration of the image pickup apparatus 1 according to the embodiment of the present invention. The same elements in the drawings are designated by the same reference numerals.

A CPU (central processing unit) 302 is mounted on a system control substrate 301. The CPU 302 controls an operation of the entire image pickup apparatus 1, and executes a variety of processes and commands for each component. Each component is connected to the system control substrate 301 through a communication module or a power supply, such as a flexible printed board, a wire cable, and a coaxial cable.

A memory 303 stores information on the image pickup action of the image pickup apparatus 1.

A power source 310 supplies the power to the CPU 302 and each component in the circuit in the image pickup apparatus 1. When the user operates a main switch 26, a power supply to each component starts and ends.

An image pickup lens unit 319 (image pickup optical system) is an optical system configured to form object image light on an image pickup plane of an image sensor 304, and includes a plurality of lenses that include a focus lens for focusing of the optical system. An optical axis 318 is a center of the optical system.

Reference numeral 14 denotes a mirror box in the image pickup apparatus, which includes a quick return mirror 15, which will be described later, and forms a space through which an image pickup light flux introduced from the image pickup lens unit 319 passes. The quick return mirror 15 includes a main mirror 15a and a sub mirror 15b, and part of the main mirror 15a is a half-mirror. The sub mirror 15b is a total reflection mirror. The main mirror 15a transmits part of image pickup light flux, and introduces the light flux to a focus detector 308 through the sub mirror 15b. When the release button 12 is pressed in the image pickup, the quick return mirror 15 rotates around the axis as a center provided at its end and retreats so that the reflected surface can be parallel to the optical axis 318.

The focus detector 308 generates two images having a parallax by dividing the refracted light into two by the sub mirror 15b, performs a phase difference focus detection, and outputs focus detection information to the CPU 302.

The release button 12 is a two-stage button S1 is turned on by the first stroke (half-press), and S2 is turned on by the second stroke (full press). A description will be given of the operations when each of S1 and S2 is turned on.

The image sensor 304 is an image pickup device configured to convert an image formed by the image pickup lens unit 319 into an electric signal and provided so as to receive light along the optical axis 318 when the main mirror 15a is retreated. Any image pickup devices, such as a CMOS sensor, a CCD sensor, and a CID (charge injection device) sensor, may be applied to the image sensor 304.

A shutter 320 configured to control an exposure time period is provided between the quick return mirror 15 and the image sensor 304.

Reference numeral 321 is a pentaprism configured to reflect and convert the image pickup light flux to an erect image reflected by the main mirror 15a through the image pickup lens unit 319, so as to enable a user to observe the object image from a viewfinder eyepiece 21. Thus, the pentaprism 321 introduces the light flux from the image pickup optical system to the viewfinder eyepiece 21. The pentaprism 321 introduces part of the light flux from the image pickup optical system to a photometric unit 309.

The photometric unit 309 converts part of the obtained light flux into a luminance signal of each area on the observation plane, and outputs the luminance signal to the CPU 302. The CPU 302 calculates an exposure value based on the thus obtained luminance signal.

When the release button 12 is half-pressed and S1 is turned on, the CPU 302 commands the focus detector 308 and the photometric unit 309 to perform a focus detection and a photometric action, and receives the obtained focus detection information and the photometric information. The CPU 302 sends the obtained focus detection information and photometric information to the image pickup lens controller 307, and the image pickup lens controller 307 drives the unillustrated focus lens and the diaphragm in the image pickup lens unit 319 based on the obtained focus detection information and photometric information. When the release button 12 is fully pressed and S2 is turned on, the CPU 302 commands the mirror controller 305, the shutter controller 306, and the image senor 304 to perform the image pickup action.

When the image pickup action starts and the image pickup light flux from the image pickup lens unit 319 enters the image sensor 304, the image sensor 304 converts the optical information into the electric signal by the photoelectric conversion and outputs the result to the CPU 302. The electric signal output to the CPU 302 is converted into an image, such as JPEG, and recorded as image data in an external memory 322 inserted into an external memory slot 311. The image data according to this embodiment is based on a known Exif (Exchangeable Image File Format) file format, and made by coupling image pickup information and position information, such as an exposure time period and an F-number, with the image information.

Reference numeral 2 is a positioning module including an antenna configured to measure the current position on the earth utilizing a satellite positioning system, such as GPS (Global Positioning System). This embodiment discusses a GPS module 2 as the positioning module. However, the present invention is not limited to this embodiment, and may adopt GLONASS (Global Navigation Satellite System). Such a positioning module (second communication module) can receive a radio wave from the satellite for positioning.

The GPS module 2 is connected to a connector 312 on a system substrate 301 via a connection member 315.

When the image data is stored in the external memory 322 by the image pickup operation of the image pickup apparatus 1, the CPU 302 sends a command to an IC 43, which will be described later in FIG. 4B in the GPS module 2, using signal information received by the satellite, so as to acquire position information, such as a longitude, a latitude, and an altitude.

The IC 43 receives the satellite radio wave via a GPS antenna 42, which will be described later in FIG. 4A, converts the received radio wave into a demodulated signal and sends it to the CPU 302. The CPU 302 finds positioning information through a predetermined calculation based on the demodulated signal, and couples recorded image data in the external memory 322.

Reference numerals 3 and 4 denote a wireless LAN (Local Area Network) module or a wireless PAN (Personal Area Network) module. Each module is connected to connectors 313 and 314 via connection members 316 and 317.

This embodiment discusses an example of using a WiFi module 3 and a BLE (Bluetooth Low Energy) module 4 for each module. However, the present invention is not limited to this embodiment, and each module may use any one of formats of WiFi, Bluetooth, ZiGbee, etc.

The WiFi module 3 transfers a captured image, sends/receives a motion through image to/from an unillustrated external device, or sends/receives an operation signal for the image pickup apparatus 1 to/from the unillustrated external device. The WiFi module 3 (first communication module) according to this embodiment is a wireless LAN module, and can send and receive a radio wave for the wireless LAN communication.

When the user operates the operation button 23, and starts sending image data recorded in the external memory 322 inserted into the external memory slot 311, to the unillustrated external device, the CPU 302 sends the image data to the IC 52, which will be described later in FIG. 5A. Next, the IC 52 modulates the image data to the desired wireless format, and converts it into the transmission frequency. Thereafter, the WiFi antenna 53, which will be described later in FIG. 5A, wirelessly sends the image data to the unillustrated external device. In wirelessly transferring the image data, a faster wireless communication speed and improved antenna performance are demanded because an image data amount per one image is large due to a high pixel density of the image sensor.

When the image pickup apparatus 1 is operated from the unillustrated external device, the WiFi antenna 53 can receive the radio wave sent from the external device. The IC 52, which will be described later in FIG. 5A, converts a received radio wave into a modulated signal, and then sends the result to the CPU 302. The CPU 302 executes a predetermined operation for the image pickup apparatus 1 based on the demodulated signal.

A consumption power of the BLE module 4 is lower than that of the WiFi module 3, and the image pickup apparatus 1 and the unillustrated external device can be paired with each other without a manual input of a PIN code. Similar to the WiFi module 3, a signal for operating the image pickup apparatus 1 from the unillustrated external device can be sent and received. The BLE module 4 (third communication module) according to this embodiment is a wireless PAN module, and a radio wave of the wireless PAN communication can be sent and received.

Herein, a using method of the wireless function is not fully described, and the known using method of the wireless LAN and wireless PAN functions premises that it can be used in the image pickup apparatus 1.

Figure 3:
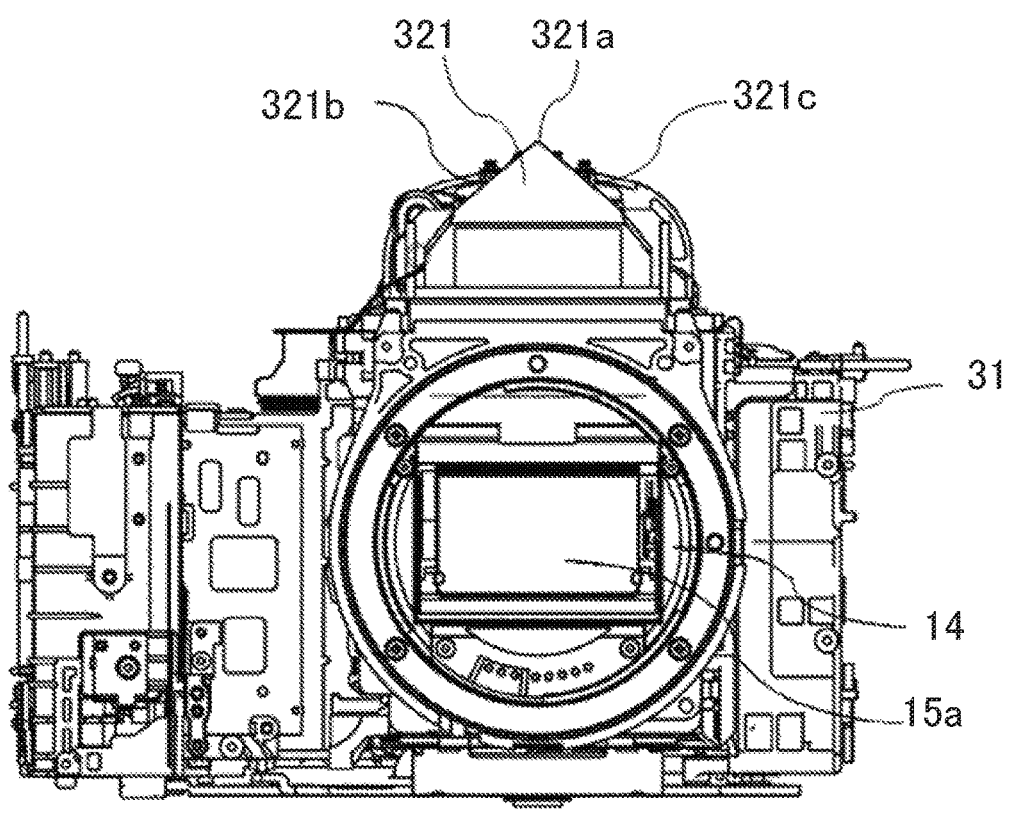
FIG. 3 is a front view of the image pickup apparatus without an exterior.

FIG. 3 is a front view of the image pickup apparatus 1 from which the exterior is removed. Reference numeral 31 denotes a body chassis, reference numeral 14 denotes a mirror box, and reference numeral 321 denotes a pentaprism.

The pentaprism 321 includes a pair of reflection roof (dach) surface 321b (second reflection surface) and reflection roof surface 321c (first reflection surface). The pair of reflection roof surfaces 321b and 321c inline by about 45° relative to the vertical direction of the image sensor 304. The roof surface 321b is closer to the release button 12, and the roof surface 321c is opposite to the roof surface 321b.

Reference numeral 321a denotes a vertex of the pentaprism, which is the highest position in a ridge between the roof surfaces 321b and 321c.

Figure 4A:
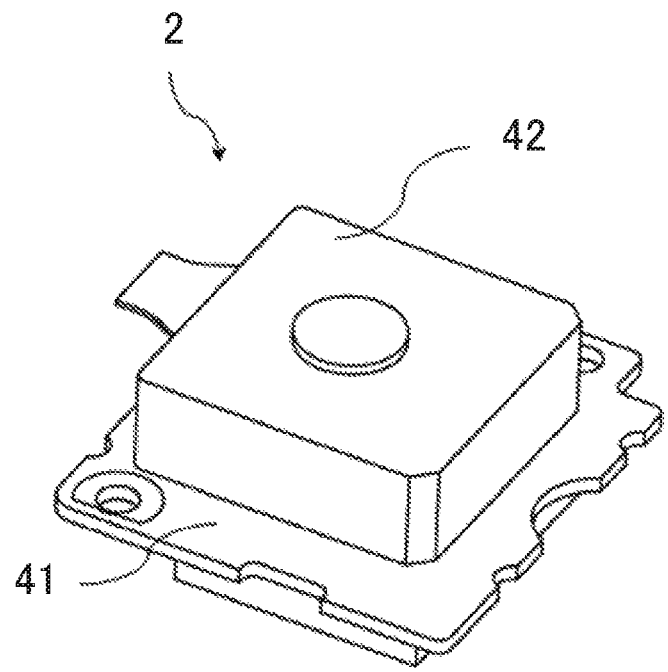
FIG. 4A is a front perspective view of a GPS module.
Figure 4B:
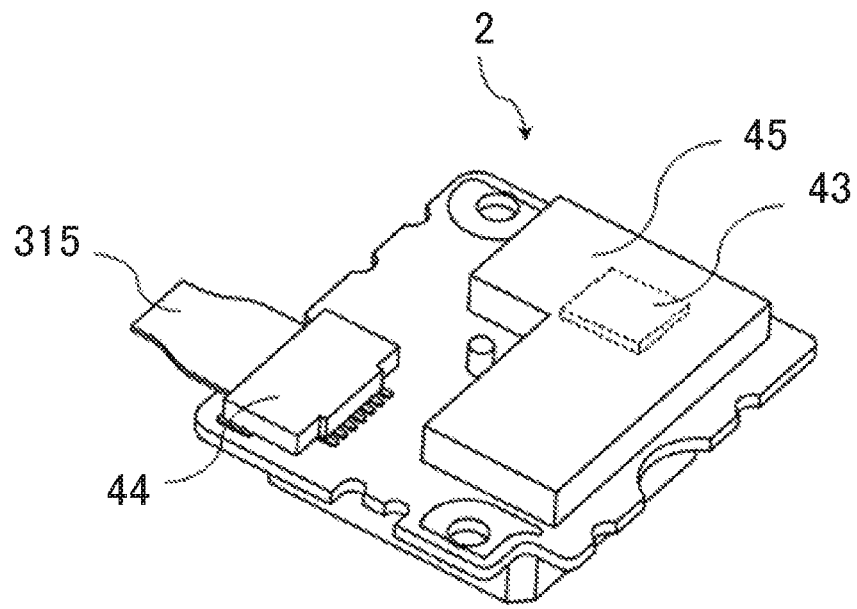
FIG. 4B is a rear perspective view of the GPS module.

FIGS. 4A and 4B are front and rear perspective views of the GPS module 2.

Reference numeral 42 denotes a GPS antenna or microstrip antenna formed by an Ag pattern on a ceramic three-dimensional surface.

An IC 43 receives a satellite radio wave via the GPS antenna 42, and converts the received radio wave into the demodulated signal.

Reference numeral 45 denotes a GPS shield, and serves as a shield that protects the IC 43 against malfunctions caused by the electromagnetic waves generated in the unillustrated external device and the image pickup apparatus 1.

Reference numeral 41 denotes a GPS substrate, mounted with the GPS antenna 42, the IC 43, the GPS shield 45, and the connector 44.

The connector 44 on the GPS module 2 and the connector 312 on the system control substrate 301 are connected to each other via the connection member 315.

Figure 5A:
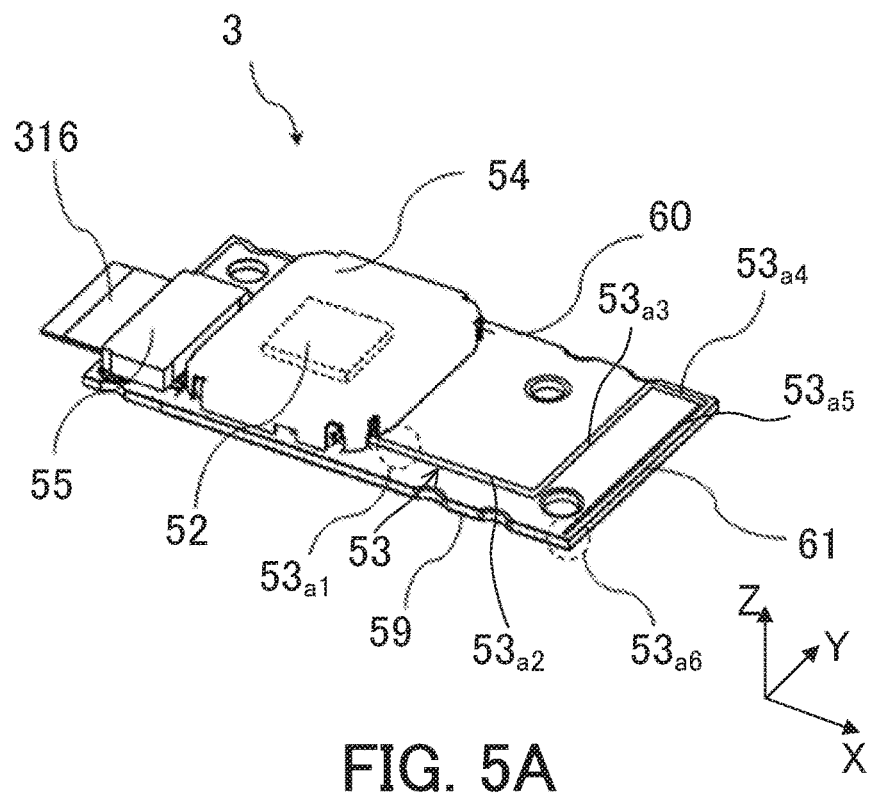
FIG. 5A is a front perspective view of a WiFi module.
Figure 5B:
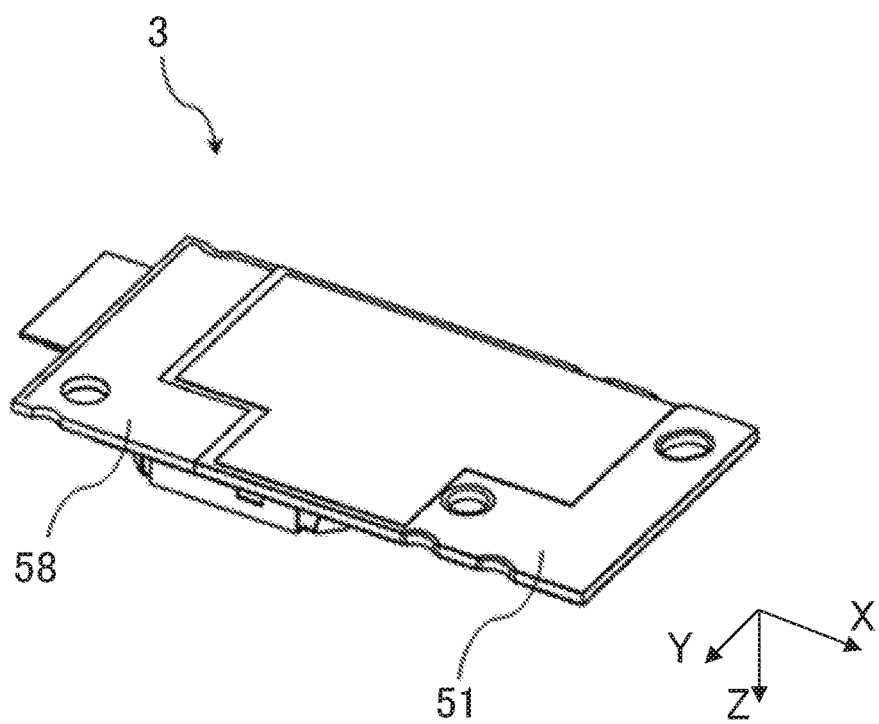
FIG. 5B is a rear perspective view of the WiFi module.

FIGS. 5A and 5B are front and rear perspective views of the WiFi module 3.

Reference numeral 53 is a WiFi antenna or microstrip antenna, formed with a copper foil on the surface of the substrate.

The IC 52 receives a modulated signal from the unillustrated external device via the WiFi antenna 53, and converts the received signal into a demodulated signal. When the IC 52 sends the data to the unillustrated external device, the data can be converted into the modulated signal and the modulated signal can be sent.

Reference numeral 54 denotes a WiFi shield, and serves as a shield that protects the IC 52 against malfunctions caused by the electromagnetic waves generated in the unillustrated external device and the image pickup apparatus 1, stabilizing the communication performance of the WiFi module 3.

Reference numeral 51 denotes a WiFi substrate mounted with the IC 52, the WiFi antenna 53, the WiFi shield 54, and the connector 55.

A connector 55 on the WiFi module 3 and the connector 313 on the system control substrate 301 are connected to each other via the connection member 316.

Reference numeral 58 denotes a GND part (grounded part formed by a metal material) without a resist film formed on the surface of the WiFi substrate 51 exposed by a conductive pattern, which has received a gold plating process and a rustproof process.

The WiFi antenna 53 includes a feeder $53a_1$ configured to supply the high-frequency current, and an oscillator $53a_6$ configured to oscillate the radio wave derived from the stray high-frequency current, to the outside. More specifically, the WiFi antenna 53 includes a first part $53a_2$ that includes a conductor extending in a +X direction (first direction) from the feeder $53a_1$ that supplies the current, a second part $53a_3$ that includes a conductor extending in a +Y direction (second direction orthogonal to the first direction) from the end of the first part $53a_2$, a third part $53a_4$ including a conductor extending in a +X direction from the end of the second part $53a_3$, and a fourth part $53a_5$ that includes a conductor extending in a −Y direction (third direction opposite to the second direction) from the end of the third part $53a_4$ and is connected to the oscillator $53a_6$ configured to oscillate the current as the radio wave. According to this embodiment, the third part $53a_4$ is referred to as an intermediate part located between the feeder $53a_1$ and the oscillator $53a_6$.

The WiFi substrate 51 includes a first side 59 adjacent to the feeder $53a_1$ and the oscillator $53a_6$ in the WiFi antenna 53, a second side 60 opposite to the first side 59, and a third side 61 connected and orthogonal to the first side 59 and the second side 60 and adjacent to the oscillator $53a_6$. In other words, the WiFi substrate 51 includes the first side 59 closer to the feeder $53a_1$ and the oscillator $53a_6$ than the intermediate part, the second side 60 closer to the intermediate part than the feeder 53a₁ and the oscillator 53a₆, and the third side 61 closer to the intermediate part and the oscillator 53a₆ than the feeder 53a₁.

Thus, the WiFi substrate 51 wired with the WiFi antenna 53 has the first side 59 and the second side 60 opposite to the first side 59 in the longitudinal direction. The feeder 53a₁ and the oscillator 53a₆ are closer to the first side 59 than the second side 60. The intermediate part is closer to the second side 60 than the first side 59. The intermediate part is a conductor closer to the second side 60 and located between the feeder 53a₁ and the oscillator 53a₆. The intermediate part may be the conductor closer to the second side 60 than the first side 59 in the WiFi antenna 53.

A wiring length of the WiFi antenna 53 is determined by the working frequency.

In order to secure the wiring length in a limited range of the WiFi substrate 51, the WiFi substrate 51 is wired so that the first side 59 and the second side 60 reciprocate in the Y direction of the WiFi substrate 51. At this time, the WiFi shield 54 serves as a conductive material that lowers the antenna performance, and thus the oscillator 53a₆ of the WiFi antenna 53 may be made close to the third side 61 that is as distant as possible from the WiFi shield 54.

The above antenna wiring is less subject to the self-generated noises.

Figure 6A:
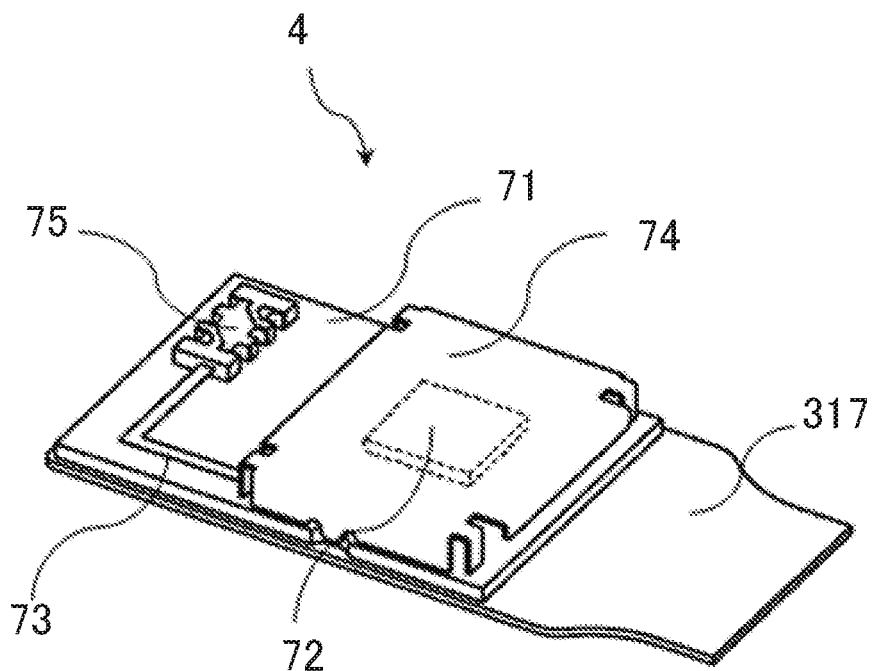
FIG. 6A is a front perspective view of a BLE module.
Figure 6B:
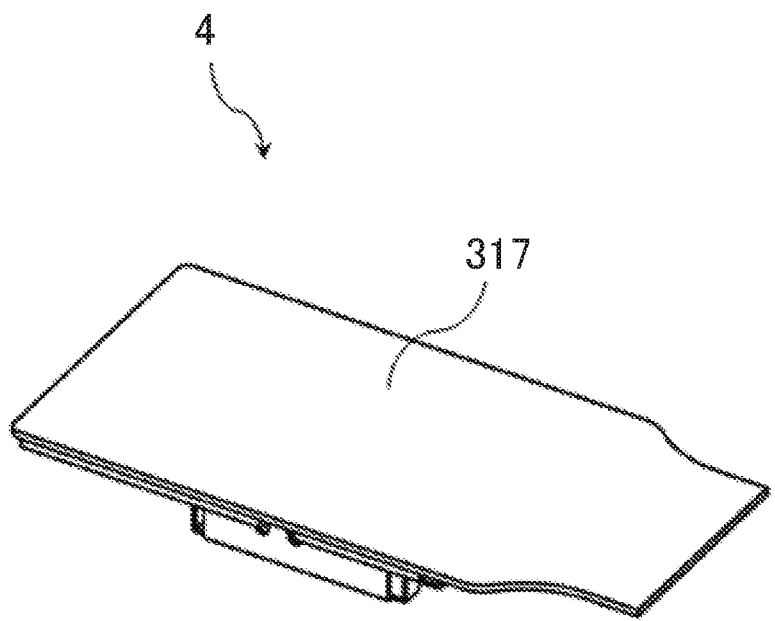
FIG. 6B is a rear perspective view of the BLE module.

FIGS. 6A and 6B are front and rear perspective views of the BLE module 4.

Reference numeral 73 denotes a BLE antenna or microstrip antenna formed with a copper foil pattern on the surface of the substrate.

The IC 72 receives a modulated signal from the unillustrated external device via the BLE antenna 73, and converts it into the demodulated signal. The IC 72 converts data into the modulated signal and sends it to the unillustrated external device.

Reference numeral 74 denotes a BLE shield, and serves as a shield that protects the IC 72 against malfunctions caused by the electromagnetic waves generated. In the unillustrated external device and the image pickup apparatus 1, stabilizing the communication performance of the BLE module 4.

Reference numeral 75 denotes an antenna IC configured to supplement the wiring length of the BLE antenna 73 when the necessary wiring length cannot be secured on the substrate.

Reference numeral 71 denotes the BLE substrate mounted with the IC 72, the BLE antenna 73, the BLE shield 74, and the antenna IC 75.

The BLE substrate 71 is connected to the connection member 317 and the system control substrate 301. This embodiment premises that the BLE substrate 71 surface-mounted on the connection member 317 (FPC), but the BLE substrate 71 may be mounted with the connector and connected to the FPC and the wire cable. As long as an electric connection is available, any methods may be used.

Figure 7:
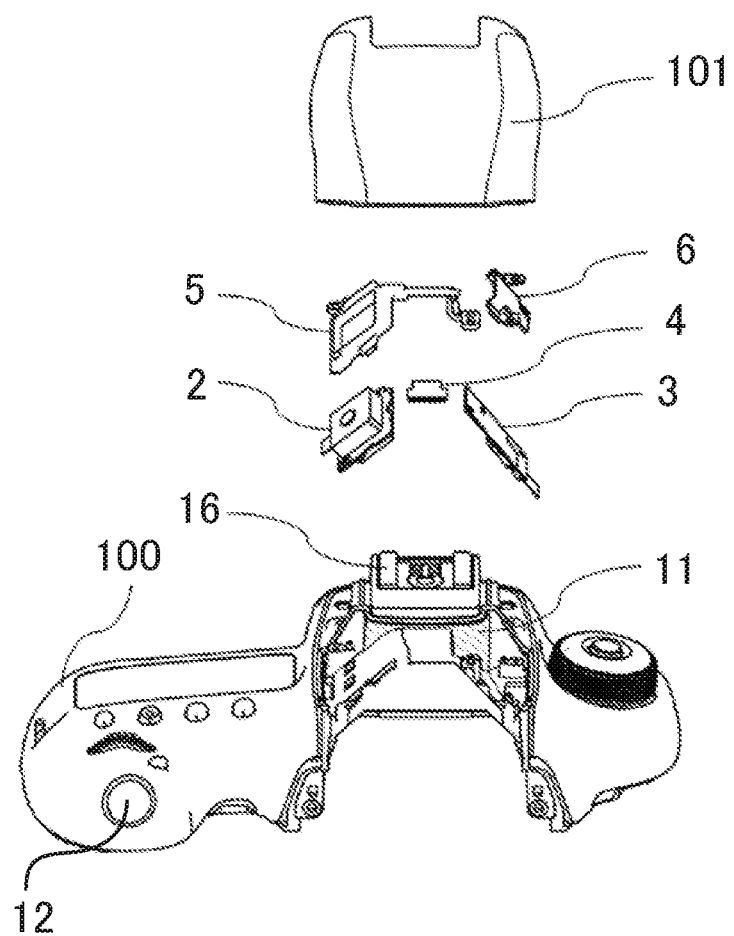
FIG. 7 is an exploded perspective view of a top cover.

FIG. 7 is an exploded perspective view of an antenna attachment part of the top cover 100.

Reference numeral 5 denotes a first holder configured to hold the GPS module 2 and the BLE module 4 and made of a nonconductive material by a PC and POM. The GPS module 2 is fixed onto the first holder 5 by an unillustrated screw, and the BLE module 4 is fixed onto the first holder 5 by an unillustrated adhesive. The first holder 5 (second holder) made of the nonconductive material holds the GPS module 2 and the BLE module 4 and is fixed onto the top cover 100 (first exterior member).

Reference numeral 6 denotes a second holder configured to hold the WiFi module 3 and is made of a conductive material, such as aluminum and phosphor bronze. The GND part 58 of the WiFi module 3 is screwed so as to contact the second holder 6. The second holder 6 (first holder) made of the conductive material holds the WiFi module 3, contacts the GND part 58, and is fixed onto the top cover 100 (first exterior member).

At this time, the WiFi module 3 needs a self-heating function or a heat radiation configuration so as to send and receive the high-frequency radio wave. Accordingly, the second holder 6 may be made of a material with a heat conductivity higher than that of the top cover 100 so as to prevent the bottleneck in the heat transport. Hence, the second holder 6 (first holder) is made of a material with a heat conductivity higher than that of the top cover 100 (first exterior member).

The antenna cover 101 contains the GPS module 2, the WiFi module 3, and the BLE module 4, and is fixed onto the top cover 100 by an unillustrated screw.

Reference numeral 11 denotes a wall of the top cover 100 formed around the accessory shoe 16 to which the accessory can be detachably attached. The wall of the top cover 100 below the accessory shoe 16 is beveled in FIG. 7.

Figure 8:
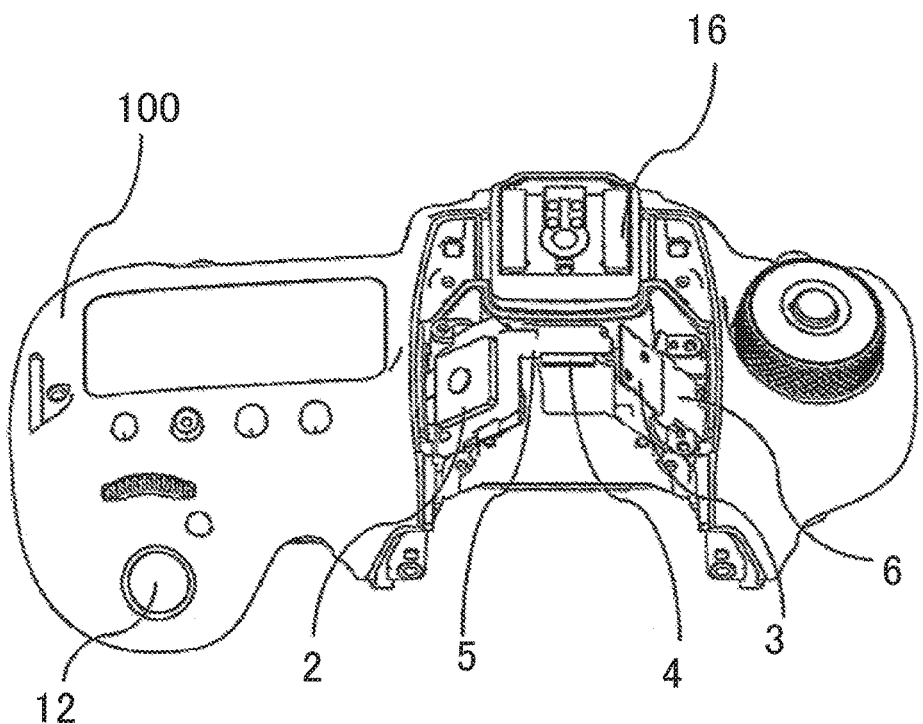
FIG. 8 is a perspective view of the top cover without an antenna cover.

FIG. 8 is a perspective view of the top cover 100 from which the antenna cover 101 is removed.

The first holder 5 is fixed onto the top cover 100 so as to dispose the GPS module 2 above the pentaprism roof surface 321b and the BLE module 4 between the pentaprism vertex 321a and the accessory shoe 16.

The second holder 6 is fixed onto the top cover 100 above the pentaprism roof surface 321c via an unillustrated screw.

Thus, the WiFi module 3 is provided on the roof surface 321c as one of a pair of roof surfaces 321b and 321c of the pentaprism 321, and the GPS module 2 is provided on the roof surface 321b as the other of the pair of roof surfaces 321b and 321c. The BLD module 4 is provided on the ridge (vertex 321a) between the pair of roof surfaces 321b and 321c.

Figure 9:
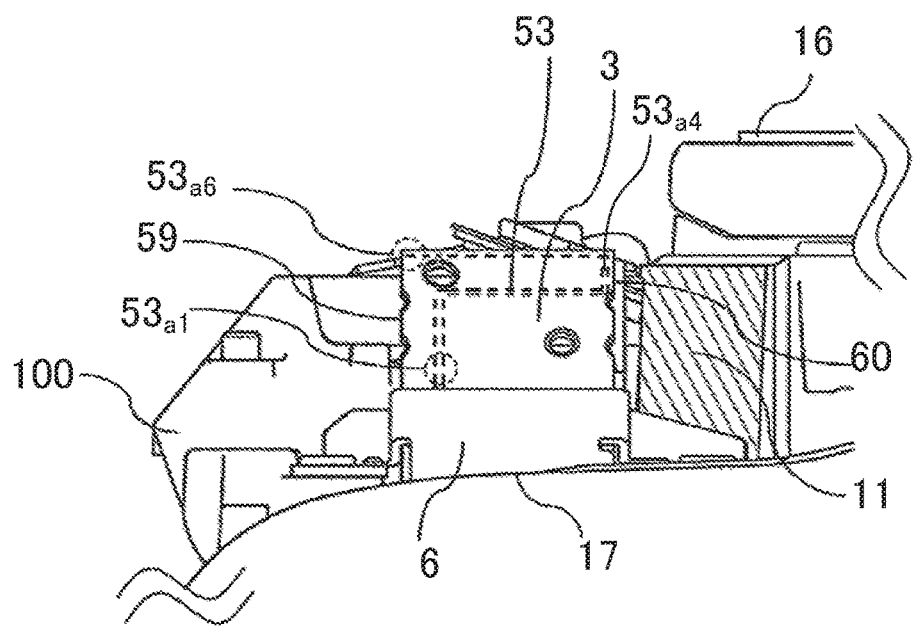
FIG. 9 is a right side view of the top cover without the antenna cover.

FIG. 9 is a right side view of the top cover 100 without the antenna cover 101.

The front side of the paper plane of the WiFi module 3 is located on the rear surface side of the WiFi substrate 51, and the WiFi antenna 53 is wired on the surface of the substrate on the back side of the paper plane. The WiFi antenna 53 is illustrated as a broken line. A description will be given or an operation when the WiFi module 3 is attached to the top cover 100.

Reference numeral 17 denotes a ridge between the top cover 100 and the antenna cover 101. The WiFi antenna 53 that includes feeder 53a₁ and the oscillator 53a₆ may be higher than the ridge 17 because it oscillates the radio wave.

Thereby, the feeder 53a₁ and the oscillator 53a₆ are located outside of the space covered by the top cover 100 (first exterior member), and inside of the space covered by the antenna cover 101 (second exterior member). More specifically, the top cover 100 (first exterior member) includes an opening defined by the ridge 17, and the antenna cover 101 (second exterior member) is provided outside of the opening and connected to the top cover 100 so as to cover the opening. The feeder 53a₁ and the oscillator 53a₆ are located inside of the space covered by the antenna cover 101 outside of the opening.

The feeder 53a₁ and the oscillator 53a₆ are likely to generate a strong electric field and a strong magnetic field in the WiFi antenna 53, and are subject to the surrounding conductive material. Thus, the first side 59 of the WiFi substrate 51 adjacent to the feeder $53a_1$ and the oscillator $53a_6$ is located apart from the wall 11 (bevel part) below the accessory shoe 16. Thereby, the feeder $53a_1$ and the oscillator $53a_6$ are farther from the wall 11 in the top cover 100 than the third part $53a_4$ (intermediate part). Hence, a first minimum distance between the third part $53a_4$ (intermediate part) and the wall 11 is shorter than any one of a second minimum distance between the feeder $53a_1$ and the wall 11 and a third minimum distance between the oscillator $53a_6$ and the wall 11.

Due to the above configuration, the antenna wired on the substrate surface like a microstrip antenna can reduce a significant deterioration of the antenna performance by keeping the feeder and oscillator away from the conductive material below the accessory shoe.

When a plurality of wireless modules of different types are arranged around the pentaprism 321, the image pickup apparatus 1 can be made effectively compact by orienting the third side 61 of the WiFi module 3 toward the vertex 321a of the pentaprism 321 (or in a longitudinal direction).

In other words, the image pickup apparatus 1 can be compact when the third side 61 as a short side in the short side direction in the WiFi module 3 is closer to the ridge connected with the pair of roof surfaces (vertex 321a) than the first side 59 and the second side 60 as long sides in the longitudinal direction.

The present invention can maintain the antenna performance when the conductive material is located near the antenna in the image pickup apparatus having the built-in antenna.

The present invention is suitable for an image pickup apparatus, such as a compact digital camera, a single-lens reflex camera, and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-243816, filed Dec. 15, 2015, which is hereby incorporated by reference herein in its entirety.

What is claimed is:

1. An image pickup apparatus comprising:
a first exterior member made of a conductive material;
a second exterior member made of a nonconductive material; and
an antenna covered by the second exterior member and configured to provide a wireless communication,
wherein the antenna includes:
a feeder configured to supply a current;
an oscillator configured to oscillate the current as a radio wave; and
an intermediate part located between the feeder and the oscillator, and
wherein the feeder and the oscillator are farther from the first exterior member than the intermediate part.

2. The image pickup apparatus according to claim 1, further comprising a substrate mounted with the antenna, and including a first side and a second side opposite to the first side,
wherein the feeder and the oscillator are closer to the first side than the second side, and the intermediate part is closer to the second side than the first side.

3. The image pickup apparatus according to claim 1, wherein the antenna includes:
a first part that includes a conductor extending from the feeder in a first direction;
a second part that includes a conductor extending from an end of the first part in a second direction orthogonal to the first direction;
a third part as the intermediate part that includes a conductor extending from an end of the second part in the first direction; and
a fourth part connected to the oscillator that includes a conductor extending from an end of the third part in a third direction opposite to the second direction.

4. The image pickup apparatus according to claim 1, further comprising an accessory shoe to which an accessory can be detachably attached,
wherein the feeder and the oscillator are farther from a wall in the first exterior member around the accessory shoe than the intermediate part.

5. The image pickup apparatus according to claim 4, wherein a first minimum distance between the intermediate part and the wall is shorter than any one of a second minimum distance between the feeder and the wall and a third minimum distance between the oscillator and the wall.

6. The image pickup apparatus according to claim 1, further comprising a pentaprism configured to introduce a light flux from an image pickup optical system to a viewfinder eyepiece,
wherein the antenna is provided on one of a pair of roof surfaces of the pentaprism.

7. The image pickup apparatus according to claim 6, further comprising a substrate mounted with the antenna, wherein the substrate includes:
a first side closer to the feeder and the oscillator than the intermediate part;
a second side closer to the intermediate part than the feeder and the oscillator; and
a third side closer to the intermediate part and the oscillator than the feeder,
wherein the substrate is disposed so that the third side is closer to a ridge between the pair of roof surfaces than the first side and the second side.

8. The image pickup apparatus according to claim 1, wherein the feeder and the oscillator are covered by the second exterior member outside the first exterior member.

9. The image pickup apparatus according to claim 1, wherein the first exterior member has an opening,
wherein the second exterior member is provided outside the opening and connected to the first exterior member so as to cover the opening, and
wherein the feeder and the oscillator are covered by the second exterior member outside the opening.

10. The image pickup apparatus according to claim 1, further comprising a first holder configured to hold a first communication module that has the antenna and a grounded part made of a metallic material,
wherein the first holder is made of a conductive material, contacts the grounded part, and is fixed onto the first exterior member.

11. The image pickup apparatus according to claim 10, wherein the first holder is made of a material of a thermal conductivity higher than that of the first exterior member.

12. The image pickup apparatus according to claim 1, further comprising a second communication module and a third communication module in the second exterior member, each of which provides a wireless communication using a wireless communication standard different from that of a first communication module having the antenna.

13. The image pickup apparatus according to claim 12, further comprising a pentaprism configured to introduce a light flux from an image pickup optical system to a viewfinder eyepiece, wherein the first communication module is provided on one of a pair of roof surfaces of the pentaprism, the second communication module is provided on the other of the pair of roof surfaces, and the third communication module is provided on a ridge between the pair of roof surfaces.

14. The image pickup apparatus according to claim 12, further comprising a second holder configured to hold the second communication module and the third communication module, made of a nonconductive material, and fixed onto the first exterior member.

15. The image pickup apparatus according to claim 12, wherein the first communication module is a wireless LAN module, the second communication module is a positioning module configured to receive a radio wave from a satellite for positioning, and the third communication module is a wireless PAN module.

\* \* \* \* \*